US012686773B2

(12) United States Patent
Yang et al.

(10) Patent No.: US 12,686,773 B2
(45) Date of Patent: Jul. 21, 2026

(54) METHOD FOR IMPROVING HEAT DISSIPATION CAPABILITY OF OIL-COOLED MOTOR, INSULATION PAINT, AND METHOD FOR MANUFACTURING INSULATION PAINT

(71) Applicant: Huawei Digital Power Technologies Co., Ltd., Shenzhen (CN)

(72) Inventors: Liuqing Yang, Xi'an (CN); Xiaohong Chi, Xi'an (CN); Zezhao Bai, Xi'an (CN); Haojun Zhang, Shenzhen (CN); Zijing Wang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 661 days.

(21) Appl. No.: 17/969,054

(22) Filed: Oct. 19, 2022

(65) Prior Publication Data

US 2023/0125453 A1      Apr. 27, 2023

(30) Foreign Application Priority Data

Oct. 26, 2021    (CN) .......................... 202111245629.9

(51) Int. Cl.
| | |
|---|---|
| *C09D 1/02* | (2006.01) |
| *C09D 5/18* | (2006.01) |
| *C09D 7/45* | (2018.01) |
| *C09D 7/62* | (2018.01) |
| *B82Y 30/00* | (2011.01) |

(52) U.S. Cl.
CPC ................ *C09D 1/02* (2013.01); *C09D 5/18* (2013.01); *C09D 7/45* (2018.01); *C09D 7/62* (2018.01); *B82Y 30/00* (2013.01)

(58) Field of Classification Search
CPC ...................................................... C09D 1/02
See application file for complete search history.

(56) References Cited

U.S. PATENT DOCUMENTS

| | | | | | |
|---|---|---|---|---|---|
| 2,574,686 | A | * | 11/1951 | Brown ................... | H02K 15/12 |
| | | | | | 427/116 |
| 2012/0043849 | A1* | | 2/2012 | Yoneda .................... | H02K 1/16 |
| | | | | | 29/596 |
| 2020/0052538 | A1* | | 2/2020 | Cao .......................... | H02K 3/50 |

FOREIGN PATENT DOCUMENTS

| | | | | | | |
|---|---|---|---|---|---|---|
| CN | 101186691 | A | * | 5/2008 | | |
| CN | 101768404 | A | | 7/2010 | | |
| CN | 105368285 | A | | 3/2016 | | |
| CN | 105860756 | A | | 8/2016 | | |
| CN | 109913062 | A | | 6/2019 | | |
| CN | 111808528 | A | | 10/2020 | | |
| CN | 113501917 | A | | 10/2021 | | |
| JP | 2006246599 | A | * | 9/2006 | | |
| WO | WO-2008002870 | A2 | * | 1/2008 | ................ | C08F 2/44 |

OTHER PUBLICATIONS

Imai et al., Preparation and Insulation Properties of Epoxy-Layered Silicate Nanocomposite, 2004 Annual Report Conference on Electrical Insulation and Dielectric Phenomena, p. 402-405 (Year: 2004).*

* cited by examiner

*Primary Examiner* — Tabatha L Penny
(74) *Attorney, Agent, or Firm* — Maier & Maier, PLLC

(57) ABSTRACT

A method for improving a heat dissipation capability of an oil-cooled motor, insulation paint, and a method for manufacturing the insulation paint. The method includes: performing insulation processing on a motor component by using insulation paint, where the motor component includes a stator winding and/or a rotor winding; and installing the motor component undergoing the insulation processing into an oil-cooled motor, where a basic component of the insulation paint is unsaturated polyesterimine modified by using an inorganic layered silicate. The insulation paint has high heat conductivity, high heat resistance, and low viscosity, and therefore can improve a heat dissipation capability of the oil-cooled motor in a use process, and reduce a temperature rise of the oil-cooled motor in the use process, thereby improving power of the oil-cooled motor and prolonging a service life of the oil-cooled motor.

6 Claims, No Drawings

METHOD FOR IMPROVING HEAT DISSIPATION CAPABILITY OF OIL-COOLED MOTOR, INSULATION PAINT, AND METHOD FOR MANUFACTURING INSULATION PAINT

CROSS-REFERENCE TO RELATED APPLICATION

This application claims priority to Chinese Patent Application No. 202111245629.9, filed on Oct. 26, 2021, which is hereby incorporated by reference in its entirety.

STATEMENT OF JOINT RESEARCH AGREEMENT

The subject matter and the claimed invention were made by or on the behalf of Xi'an Jiaotong University, of Xi'an, P.R. China and Huawei Technologies Co., Ltd., of Shenzhen, Guangdong Province, P.R. China, under a joint research agreement titled "High paint cleaning technology cooperation." The joint research agreement was in effect on or before the claimed invention was made, and that the claimed invention was made as a result of activities undertaken within the scope of the joint research agreement.

TECHNICAL FIELD

The embodiments relate to the field of motor technologies, a method for improving a heat dissipation capability of an oil-cooled motor, insulation paint, and a method for manufacturing the insulation paint.

BACKGROUND

When a motor runs, a stator winding and a rotor winding rotate at a high speed and are impacted by an electric field, so that the stator winding and the rotor winding generate heat. In particular, when a variable frequency speed regulation motor with medium/high voltage and high power runs, a stator winding and a rotor winding generate relatively high heat. If heat of the stator winding and the rotor winding cannot be dissipated in time, heat accumulates. As a result, not only running efficiency of the motor is affected, but also aging of insulation materials of the stator winding and the rotor winding is accelerated, which shortens a service life of the motor.

Currently, an insulation material used for a stator may be a polymer insulation material and most polymer insulation materials have relatively low heat conductivity. For example, a coefficient of heat conductivity of polyesterimide is about 0.2 W/(m·K). An insulation material with low heat conductivity prevents heat exchange of the stator winding and the rotor winding to a specific extent, resulting in aging of the insulation materials of the stator winding and the rotor winding, which shortens a service life of the motor.

Therefore, it is of great significance for structural optimization and performance improvement of the variable frequency speed regulation motor with medium/high voltage and high power to improve a heat-conducting feature of the motor while maintaining or improving electrical, mechanical, and heat-resistance features of an insulation material used for the motor.

SUMMARY

The embodiments may provide a method for improving a heat dissipation capability of an oil-cooled motor, insulation paint, and a method for manufacturing the insulation paint, to improve a heat dissipation capability of a motor in a use process.

According to a first aspect, an embodiment may provide a method for improving a heat dissipation capability of an oil-cooled motor, including: performing insulation processing on a motor component by using insulation paint, where the motor component includes a stator winding and/or a rotor winding; and installing the motor component undergoing the insulation processing into an oil-cooled motor, where a basic component of the insulation paint is unsaturated polyesterimine modified by using an inorganic layered silicate.

The insulation paint has high heat conductivity, high heat resistance, and low viscosity, and therefore can improve a heat dissipation capability of the oil-cooled motor in a use process, and reduce a temperature rise of the oil-cooled motor in the use process, thereby improving power of the oil-cooled motor and prolonging a service life of the oil-cooled motor.

In a possible implementation, a weight percentage of the inorganic layered silicate in the insulation paint ranges from 1 wt % to 35 wt %, and a weight percentage of the unsaturated polyesterimine in the insulation paint ranges from 40 wt % to 70 wt %. In an example, the weight percentage of the inorganic layered silicate in the insulation paint is 30 wt %, and the weight percentage of the unsaturated polyesterimine in the insulation paint is 40 wt %. In an example, the weight percentage of the inorganic layered silicate in the insulation paint is 1 wt %, and the weight percentage of the unsaturated polyesterimine in the insulation paint is 70 wt %. In an example, the weight percentage of the inorganic layered silicate in the insulation paint is 20 wt %, and the weight percentage of the unsaturated polyesterimine in the insulation paint is 55 wt %. In an example, the weight percentage of the inorganic layered silicate in the insulation paint is 15 wt %, and the weight percentage of the unsaturated polyesterimine in the insulation paint is 60 wt %. In an example, the weight percentage of the inorganic layered silicate in the insulation paint is 10 wt %, and the weight percentage of the unsaturated polyesterimine in the insulation paint is 65 wt %. In an example, the weight percentage of the inorganic layered silicate in the insulation paint is 35 wt %, and the weight percentage of the unsaturated polyesterimine in the insulation paint is 50 wt %.

In this implementation, proportions of the unsaturated polyesterimine and the inorganic layered silicate in the insulation paint may be adjusted to obtain insulation paint with better performance.

In a possible implementation, a particle size of the inorganic layered silicate is at a micron level, and a length-diameter ratio of the inorganic layered silicate is greater than 300.

In this implementation, the unsaturated polyesterimine is modified by using an inorganic layered silicate whose granularity is at a micron level and whose length-diameter ratio is greater than 300, to obtain insulation paint with better performance.

In a possible implementation, the inorganic layered silicate in the insulation paint is a modified inorganic layered silicate that undergoes surface lipophilic modification.

In this implementation, surface lipophilic modification may be performed on the inorganic layered silicate to increase compatibility between the inorganic layered silicate and the unsaturated polyesterimine, to further improve performance of the insulation paint.

In a possible implementation, the inorganic layered silicate in the insulation paint includes any one or a combination of a plurality of montmorillonite, kaolinite, and a mica disc.

In a possible implementation, the insulation paint further includes a modified nano anti-settling agent whose weight percentage ranges from 0.5 wt % to 10 wt %. The modified nano anti-settling agent is an inorganic nano spherical oxide that undergoes surface lipophilic modification, and the inorganic nano spherical oxide includes any one or a combination of two of silicon dioxide and titanium dioxide.

In this implementation, the modified nano anti-settling agent is added to the insulation paint, to further improve performance of the insulation paint.

In a possible implementation, components of the insulation paint are as follows:

unsaturated polyesterimine: 40 wt % to 70 wt %;
modified nano anti-settling agent: 0.5 wt % to 10 wt %;
modified inorganic layered silicate: 1 wt % to 35 wt %;
reactive diluent: 5 wt % to 20 wt %;
anti-foaming agent: 0.1 wt % to 2.5 wt %;
leveling agent: 0.1 wt % to 2.5 wt %;
dispersing agent: 0.1 wt % to 2.5 wt %; and
peroxide: 0.5 wt % to 3 wt %.

In this implementation, proportions of the components of the insulation paint are adjusted, to further improve performance of the insulation paint.

According to a second aspect, an embodiment may provide insulation paint, where a basic component of the insulation paint is unsaturated polyesterimine modified by using an inorganic layered silicate.

The insulation paint has high heat conductivity, high heat resistance, and low viscosity. When the insulation paint is applied to a motor, a heat dissipation capability of the motor in a use process can be improved, and a temperature rise of the motor in the use process can be reduced, thereby improving power of the motor and prolonging a service life of the motor.

In a possible implementation, a weight percentage of the inorganic layered silicate in the insulation paint ranges from 1 wt % to 35 wt %, and a weight percentage of the unsaturated polyesterimine in the insulation paint ranges from 40 wt % to 70 wt %. In an example, the weight percentage of the inorganic layered silicate in the insulation paint is 30 wt %, and the weight percentage of the unsaturated polyesterimine in the insulation paint is 40 wt %. In an example, the weight percentage of the inorganic layered silicate in the insulation paint is 1 wt %, and the weight percentage of the unsaturated polyesterimine in the insulation paint is 70 wt %. In an example, the weight percentage of the inorganic layered silicate in the insulation paint is 20 wt %, and the weight percentage of the unsaturated polyesterimine in the insulation paint is 55 wt %. In an example, the weight percentage of the inorganic layered silicate in the insulation paint is 15 wt %, and the weight percentage of the unsaturated polyesterimine in the insulation paint is 60 wt %. In an example, the weight percentage of the inorganic layered silicate in the insulation paint is 10 wt %, and the weight percentage of the unsaturated polyesterimine in the insulation paint is 65 wt %. In an example, the weight percentage of the inorganic layered silicate in the insulation paint is 35 wt %, and the weight percentage of the unsaturated polyesterimine in the insulation paint is 50 wt %.

In this implementation, proportions of the unsaturated polyesterimine and the inorganic layered silicate in the insulation paint may be adjusted to obtain insulation paint with better performance.

In a possible implementation, a particle size of the inorganic layered silicate is at a micron level, and a length-diameter ratio of the inorganic layered silicate is greater than 300.

In this implementation, the unsaturated polyesterimine is modified by using an inorganic layered silicate whose granularity is at a micron level and whose length-diameter ratio is greater than 300, to obtain insulation paint with better performance.

In a possible implementation, the inorganic layered silicate in the insulation paint is a modified inorganic layered silicate that undergoes surface lipophilic modification.

In this implementation, surface lipophilic modification may be performed on the inorganic layered silicate to increase compatibility between the inorganic layered silicate and the unsaturated polyesterimine, to further improve performance of the insulation paint.

In a possible implementation, the inorganic layered silicate in the insulation paint includes any one or a combination of a plurality of montmorillonite, kaolinite, and a mica disc.

In a possible implementation, the insulation paint further includes a modified nano anti-settling agent whose weight percentage ranges from 0.5 wt % to 10 wt %. The modified nano anti-settling agent is an inorganic nano spherical oxide that undergoes surface lipophilic modification, and the inorganic nano spherical oxide includes any one or a combination of two of silicon dioxide and titanium dioxide.

In this implementation, the modified nano anti-settling agent is added to the insulation paint, to further improve performance of the insulation paint.

In a possible implementation, components of the insulation paint are as follows:

unsaturated polyesterimine: 40 wt % to 70 wt %;
modified nano anti-settling agent: 0.5 wt % to 10 wt %;
modified inorganic layered silicate: 1 wt % to 35 wt %;
reactive diluent: 5 wt % to 20 wt %;
anti-foaming agent: 0.1 wt % to 2.5 wt %;
leveling agent: 0.1 wt % to 2.5 wt %;
dispersing agent: 0.1 wt % to 2.5 wt %; and
peroxide: 0.5 wt % to 3 wt %.

In this implementation, proportions of the components of the insulation paint are adjusted, to further improve performance of the insulation paint.

According to a third aspect, an embodiment may provide a method for manufacturing the insulation paint according to the second aspect, where the method includes the following steps.

Step (1): Put unsaturated polyesterimine, a reactive diluent, and a dispersing agent into a reactor and mix these materials to obtain a first mixed reagent.

Step (2): Add an anti-settling agent to the first mixed reagent to obtain first modified insulation paint.

Step (3): Add an inorganic layered silicate to the first modified insulation paint, and then perform mixing processing in a condition of 50° C. to 90° C. to obtain second modified insulation paint.

Step (4): Add an auxiliary agent to the second modified insulation paint and perform mixing processing and degassing processing to obtain the insulation paint.

In a possible implementation, the inorganic layered silicate is a modified inorganic layered silicate that undergoes surface lipophilic modification, and the method further includes: manufacturing the modified inorganic layered silicate. The manufacturing the modified inorganic layered silicate includes:

adding the inorganic layered silicate to the first mixed reagent, and performing mixing processing in a condition of 30° C. to 80° C. to obtain a first suspension; and adding a first surface modifier to the first suspension to react, and then adding a coupling agent to continue to react to obtain the modified inorganic layered silicate.

In a possible implementation, the first surface modifier is a hexadecyl quaternary ammonium salt and/or an octadecyl quaternary ammonium salt, and the coupling agent is a silane coupling agent and/or a titanate coupling agent.

In a possible implementation, the anti-settling agent is a modified nano anti-settling agent, and the method further includes: manufacturing the modified nano anti-settling agent. The manufacturing the modified nano anti-settling agent includes: adding an inorganic nano spherical oxide to the first reagent, and performing dispersion processing and mixing processing in the condition of 30° C. to 80° C. to obtain the first suspension, where the first reagent is any one or a combination of two of water and ethanol; and adding the first surface modifier to the first suspension to perform surface lipophilic modification on the inorganic nano spherical oxide.

In a possible implementation, step (1) may include: putting, into the reactor, 40 to 70 parts by weight of the unsaturated polyesterimine, 5 to 20 parts by weight of the reactive diluent, and 0.1 to 2.5 parts by weight of the dispersing agent and mix these materials to obtain the first mixed reagent. Step (2) may include: adding 0.5 to 10 parts by weight of the modified nano anti-settling agent to the first mixed reagent, and then performing dispersion processing and mixing processing in a condition of 50° C. to 90° C. to obtain first nano modified insulation paint. Step (3) may include: adding 1 to 35 parts by weight of the modified inorganic layered silicate to the first nano modified insulation paint, and then performing mixing processing in a condition of 50° C. to 90° C. to obtain second nano modified insulation paint. Step (4) may include: adding 0.1 to 2.5 parts by weight of an anti-foaming agent, 0.1 to 2.5 parts by weight of a leveling agent, and 0.5 to 3 parts by weight of a peroxide to the second nano modified insulation paint and performing mixing processing and degassing processing to obtain the insulation paint.

The insulation paint provided in the embodiments may have high heat conductivity, high heat resistance, and low viscosity. When the insulation paint is applied to a motor, a heat dissipation capability of the motor in a use process can be improved, and a temperature rise of the motor in the use process can be reduced, thereby improving power of the motor and prolonging a service life of the motor.

DETAILED DESCRIPTION OF THE EMBODIMENTS

The following describes the embodiments. It is clear that the described embodiments are merely some but not all of embodiments. In addition, it should be noted that, if no special description is provided in the embodiments, "a plurality of" means two or more.

Generally, there are two research directions for improving a heat-conducting feature of a polymer insulation material.

Direction a: A bulk polymer with high crystallinity or a high degree of orientation is obtained through synthesis to obtain an intrinsic heat-conducting material with a high heat-conducting feature. For example, an epoxy resin with a liquid crystal structure is manufactured. A research and development process of an intrinsic polymer with high heat conductivity is long, has high costs, develops slowly, and is basically in a laboratory research phase.

Direction b: A filler with high heat conductivity is doped into a polymer insulation material to manufacture a filled composite material, to improve heat-conducting performance. Therefore, currently, a filled polymer composite material with high heat conductivity is a main application manner of a polymer material with high heat conductivity. A coefficient of heat conductivity of the filled polymer composite material with high heat conductivity is affected by a plurality of factors. These factors include: a type of the filler, content of the filler, morphology of the filler, particle size distribution of the filler, a combination of the filler and a polymer matrix, and the like.

In one solution based on the direction b, heat-conducting fillers such as silica powder and aluminum nitride are compounded with polyesterimide to obtain impregnating paint whose coefficient of heat conductivity can reach 0.4 (W/m·K) to 0.55 (W/m·K). In this solution, the aluminum nitride is used as the heat-conducting filler. On one hand, because the aluminum nitride has a strong tackifying capability, viscosity of the manufactured impregnating paint is relatively high. On the other hand, the aluminum nitride is gradually hydrolyzed during use and releases ammonia, which affects insulation performance of the impregnating paint, and further attenuates heat-conducting performance of the impregnating paint.

In another solution based on the direction b, montmorillonite and graphene are used to modify water-based impregnating paint to enhance a heat-conducting capability of the impregnating paint. In this solution, an ultra-high heat-conducting capability of the graphene is used to enhance the heat-conducting capability of the impregnating paint. Because the graphene also has electrical conductivity, application of the impregnating paint in a motor is limited.

The embodiments may provide insulation paint whose basic component is unsaturated polyesterimine modified by using an inorganic layered silicate. The inorganic layered silicate may also be referred to as a heat-conducting additive, which increases heat conductivity of the insulation paint.

The insulation paint provided in the embodiments may have high heat conductivity, high heat resistance, and low viscosity, and can be used for insulation and impregnation of motors such as a motor used in a vehicle, a motor used in a ship, and a wind turbine generator, to improve a heat dissipation capability of the motor in a use process, and reduce a temperature rise of the motor in the use process, thereby improving power of the motor. For example, a vacuum pressure impregnation (VPI) process or trickle impregnation may be used to perform insulation processing on a stator winding and/or a rotor winding of an oil-cooled motor, and then the stator winding and/or the rotor winding undergoing the insulation processing are/is installed into the oil-cooled motor, to improve a heat dissipation capability of the oil-cooled motor in a running process.

The insulation paint provided in the embodiments is described below.

In the insulation paint provided in the embodiments, a weight percentage of the unsaturated polyesterimine ranges from 40 wt % to 70 wt %, and a weight percentage of the inorganic layered silicate ranges from 1 wt % to 35 wt %.

In some embodiments, a particle size of the inorganic layered silicate is at a micron level.

In some embodiments, a length-diameter ratio of the inorganic layered silicate is greater than 300.

In some embodiments, the inorganic layered silicate may be a modified inorganic layered silicate or a modified heat-conducting additive. The modified inorganic layered silicate may be a modified inorganic layered silicate that undergoes surface lipophilic modification.

For ease of description, an inorganic layered silicate that does not undergo modification may be referred to as an unmodified inorganic layered silicate. An inorganic layered silicate that undergoes modification is referred to as a modified inorganic layered silicate. The inorganic layered silicate that does not undergo modification may be an inorganic layered silicate that does not undergo surface lipophilic modification, and the inorganic layered silicate that undergoes modification may be an inorganic layered silicate that undergoes surface lipophilic modification.

In one example, the inorganic layered silicate may be montmorillonite. In another example, the inorganic layered silicate may be kaolinite. In still another example, the inorganic layered silicate may be a mica disc. In still another example, the inorganic layered silicate may be a combination of any two or three of the montmorillonite, the kaolinite, and the mica disc.

In some embodiments, the insulation paint provided in the embodiments may further include an anti-settling agent. For example, in the insulation paint, a weight percentage of the anti-settling agent ranges from 0.5 wt % to 10 wt %. For example, the anti-settling agent may be a modified nano anti-settling agent. The modified nano anti-settling agent may be an inorganic nano spherical oxide that undergoes surface lipophilic modification. The inorganic nano spherical oxide is an inorganic spherical oxide whose particle size is at a nanometer level. In one example, the inorganic nano spherical oxide may be silicon dioxide. In another example, the inorganic nano spherical oxide may be titanium dioxide. In still another example, the inorganic nano spherical oxide may be a combination of the silicon dioxide and the titanium dioxide.

In some embodiments, the insulation paint provided in the embodiments may further include a reactive diluent. For example, in the insulation paint, a weight percentage of the reactive diluent ranges from 5 wt % to 20 wt %. The reactive diluent is a solvent with a degree of unsaturation. In an example, the reactive diluent is any one of styrene, methacrylate, or vinyltoluene. In an example, the reactive diluent is a combination of any two or three of the styrene, the methacrylate, and the vinyltoluene. It should be noted that the reactive diluents listed herein are merely used as examples to describe the reactive diluent used in the embodiments and constitute no limitation. In other embodiments, other reactive diluents may be used, which are not listed one by one herein.

In some embodiments, the insulation paint provided in the embodiments may further include an anti-foaming agent. For example, in the insulation paint, a weight percentage of the anti-foaming agent ranges from 0.1 wt % to 2.5 wt %. In an example, the anti-foaming agent may be BYK065. In an example, the anti-foaming agent may be BYK099. In an example, the anti-foaming agent may be BYK055. It should be noted that the anti-foaming agents listed herein are merely used as examples to describe the anti-foaming agent used in the embodiments and constitute no limitation. In other embodiments, other anti-foaming agents may be used, which are not listed one by one herein.

In some embodiments, the insulation paint provided in the embodiments may further include a leveling agent. For example, in the insulation paint, a weight percentage of the leveling agent ranges from 0.1 wt % to 2.5 wt %. In an example, the leveling agent may be BYK354. In an example, the leveling agent may be BYK380. In an example, the leveling agent may be BYK333. It should be noted that the leveling agents listed herein are merely used as examples to describe the leveling agent used in the embodiments and constitute no limitation. In other embodiments, other leveling agents may be used, which are not listed one by one herein.

In some embodiments, the insulation paint provided in the embodiments may further include a dispersing agent. For example, in the insulation paint, a weight percentage of the dispersing agent ranges from 0.1 wt % to 2.5 wt %. In an example, the dispersing agent may be BYK9076. In an example, the dispersing agent may be BYK220S. In an example, the dispersing agent may be Disperbyk 110. In an example, the dispersing agent may be Disperbyk 130. It should be noted that the dispersing agents listed herein are merely used as examples to describe the dispersing agent used in the embodiments and constitute no limitation. In other embodiments, other dispersing agents may be used, which are not listed one by one herein.

In some embodiments, the insulation paint provided in the embodiments may further include a peroxide. For example, in the insulation paint, a weight percentage of the peroxide ranges from 0.5 wt % to 3 wt %. In an example, the peroxide may be tert-Butyl peroxybenzoate. In an example, the peroxide may be a Di-tert-butyl peroxide. In an example, the peroxide may be Di-(tert-butylperoxy) cyclohexane. It should be noted that the peroxides listed herein is merely used as examples to describe the peroxide used in the embodiments and constitute no limitation. In other embodiments, other peroxides may be used, which are not listed one by one herein.

Components of the insulation paint provided in the embodiments are described above. A solution for manufacturing the insulation paint provided in the embodiments is described below.

40 to 70 parts by weight of unsaturated polyesterimine, 5 to 20 parts by weight of a reactive diluent, and 0.1 to 2.5 parts by weight of a dispersing agent are evenly mixed for 30 min to 60 min in a reactor. Then, 0.5 to 10 parts by weight of an anti-settling agent is added, and ultrasonic dispersion (ultrasonic parameters are 300 W-1500 W and 20 kHz-60 kHz) and mechanical stirring (a stirring rate is 300 rpm to 1500 rpm) are performed for 30 min to 90 min in a condition of 50° C. to 90° C. to obtain nano modified insulation paint whose nano particles are evenly dispersed. Afterwards, 1 to 35 parts by weight of an inorganic layered silicate is added to the nano modified insulation paint, and mechanical stirring (a stirring rate is 300 rpm to 1500 rpm) is performed for 30 min to 60 min in a condition of 50° C. to 90° C. Finally, 0.1 to 2.5 parts by weight of an anti-foaming agent, 0.1 to 2.5 parts by weight of a leveling agent, and 0.5 to 3 parts by weight of a peroxide are added, and in a condition of 20° C. to 30° C., stirring is performed for 30 min to 60 min and vacuum degassing is performed for 30 min, to obtain micron/nano modified insulation paint with high conductivity used for a motor, that is, the insulation paint provided in the embodiments.

The anti-settling agent used for manufacturing the insulation paint may be a modified nano anti-settling agent. A process of manufacturing the modified nano anti-settling agent is as follows.

An inorganic nano spherical oxide with purity higher than 99% is dispersed in a solvent A1. Ultrasonic dispersion (ultrasonic parameters are 300 W-1500 W and 20 kHz-60 kHz) and mechanical stirring (a stirring rate is 300 rpm to 1500 rpm) are performed in a condition of 30° C. to 80° C. to obtain an evenly dispersed suspension. A surface modifier A2 is added to the suspension, and reaction time is 30 min to 90 min. Centrifugal purification, drying, grinding, and sieving (more than 200 meshes) are performed on a reacted suspension to obtain a nano anti-settling agent that undergoes surface lipophilic modification. The obtained nano anti-settling agent that undergoes surface lipophilic modification is used as the modified nano anti-settling agent to participate in manufacturing of the insulation paint. The solvent A1 may be water, may be ethanol, or may be liquid mixed by the water and the ethanol. The surface modifier A2 may be a silane coupling agent, may be a titanate coupling agent, or may be a mixture of the silane coupling agent and the titanate coupling agent.

The inorganic layered silicate used for manufacturing the insulation paint may be a modified inorganic layered silicate. A process of manufacturing the modified inorganic layered silicate is as follows.

An inorganic layered silicate (that is, an unmodified inorganic layered silicate) of a micron granularity with purity higher than 95% is dispersed in a solvent B1, and mechanical stirring (a stirring rate is 300 rpm to 1500 rpm) is performed in a condition of 30° C. to 80° C. to obtain an evenly dispersed suspension. First, a surface modifier B2 is added to the suspension to react for 30 min to 90 min, and then a coupling agent B3 is added to continue to react for 30 min to 90 min. Centrifugal purification, drying, grinding, and sieving (more than 200 meshes) are performed on a reacted suspension to obtain a micron heat-conducting additive that undergoes surface lipophilic modification. The micron heat-conducting additive that undergoes surface lipophilic modification is used as a modified heat-conducting additive or the modified inorganic layered silicate to participate in manufacturing of the insulation paint. The solvent B1 may be water, may be ethanol, or may be liquid mixed by the water and the ethanol. The surface modifier B2 may be a hexadecyl quaternary ammonium salt, may be an octadecyl quaternary ammonium salt, or may be a mixture of the hexadecyl quaternary ammonium salt and the octadecyl quaternary ammonium salt. The coupling agent B3 may be a silane coupling agent, may be a titanate coupling agent, or may be a mixture of the silane coupling agent and the titanate coupling agent.

Next, the insulation paint provided in the embodiments is described by using an example with reference to an embodiment shown in Table 1.

TABLE 1

| | | Embodiment formula | | | | | |
|---|---|---|---|---|---|---|---|
| Formula | | Embodiment 1 | Embodiment 2 | Embodiment 3 | Embodiment 4 | Embodiment 5 | Embodiment 6 |
| Unsaturated polyesterimine | wt % | 40 | 70 | 55 | 60 | 65 | 50 |
| Modified nano anti-settling agent | wt % | 0.5 | 10 | 2 | 5 | 2 | 5 |
| Modified inorganic layered silicate | wt % | 30 | 1 | 20 | 15 | 10 | 35 |
| Reactive diluent | wt % | 21.5 | 13 | 18 | 15 | 20 | 5 |
| Anti-foaming agent | wt % | 2.5 | 1 | 1.3 | 0.7 | 0.8 | 0.7 |
| Leveling agent | wt % | 2.5 | 0.5 | 1.2 | 1.8 | 0.6 | 1.8 |

10

TABLE 1-continued

| | | Embodiment formula | | | | | |
|---|---|---|---|---|---|---|---|
| Formula | | Embodiment 1 | Embodiment 2 | Embodiment 3 | Embodiment 4 | Embodiment 5 | Embodiment 6 |
| Dispersing agent | wt % | 2.5 | 1.5 | 1 | 0.5 | 0.6 | 0.5 |
| Peroxide | wt % | 0.5 | 3 | 1.5 | 2 | 1 | 2 |

Embodiment 1

Silicon dioxide of a nano granularity with purity higher than 99% is dispersed in a solvent A1. Ultrasonic dispersion (ultrasonic parameters are 900 W and 40 kHz) and mechanical stirring (a stirring rate is 900 rpm) are performed in a condition of 50° C. to obtain an evenly dispersed suspension. A surface modifier A2 is added to the suspension, and reaction time is 60 min. Centrifugal purification, drying, grinding, and sieving (more than 200 meshes) are performed on a reacted suspension to obtain a nano anti-settling agent that undergoes surface lipophilic modification. The obtained nano anti-settling agent that undergoes surface lipophilic modification is used as the modified nano anti-settling agent to participate in manufacturing of the insulation paint in the embodiments. The solvent A1 is water, and the surface modifier A2 is a silane coupling agent.

Montmorillonite of a micron granularity with purity higher than 95% is dispersed in a solvent B1, and mechanical stirring (a stirring rate is 500 rpm) is performed in a condition of 60° C. to obtain an evenly dispersed suspension. First, a surface modifier B2 is added to the suspension to react for 40 min, and then a coupling agent B3 is added to continue to react for 40 min. Centrifugal purification, drying, grinding, and sieving (more than 200 meshes) are performed on a reacted suspension to obtain a micron heat-conducting additive that undergoes surface lipophilic modification. The micron heat-conducting additive that undergoes surface lipophilic modification is used as a modified heat-conducting additive or the modified inorganic layered silicate to participate in manufacturing of the insulation paint in the embodiments. The solvent B1 may be ethanol, the surface modifier B2 is a hexadecyl quaternary ammonium salt, and the coupling agent B3 may be a titanate coupling agent.

40 parts by weight of the unsaturated polyesterimine, 21.5 parts by weight of the reactive diluent (which may be styrene), and 2.5 parts by weight of the dispersing agent (which may be BYK9076) are evenly mixed for 50 min in a reactor. Then, 0.5 parts by weight of the modified nano anti-settling agent is added, and ultrasonic dispersion (ultrasonic parameters are 300 W and 60 kHz) and mechanical stirring (a stirring rate is 1500 rpm) are performed for 30 min in a condition of 90° C. to obtain nano modified insulation paint whose nano particles are evenly dispersed. Afterwards, 30 parts by weight of the modified inorganic layered silicate is added to the nano modified insulation paint, and mechanical stirring (a stirring rate is 300 rpm) is performed for 45 min in a condition of 50° C. Finally, 2.5 parts by weight of the anti-foaming agent (which may be ally BYK065), 2.5 parts by weight of the leveling agent (which may be BYK354), and 0.5 parts by weight of the peroxide (which may be tert-Butyl peroxybenzoate) are added, and in a condition of 30° C., stirring is performed for 30 min and vacuum degassing is performed for 30 min, to obtain micron/nano modified insulation paint with high conductivity used for a motor, that is, the insulation paint provided in the embodiments.

Embodiment 2

Titanium dioxide of a nano granularity with purity higher than 99% is dispersed in a solvent A1. Ultrasonic dispersion (ultrasonic parameters are 300 W and 40 kHz) and mechanical stirring (a stirring rate is 1500 rpm) are performed in a condition of 50° C. to obtain an evenly dispersed suspension. A surface modifier A2 is added to the suspension, and reaction time is 90 min. Centrifugal purification, drying, grinding, and sieving (more than 200 meshes) are performed on a reacted suspension to obtain a nano anti-settling agent that undergoes surface lipophilic modification. The obtained nano anti-settling agent that undergoes surface lipophilic modification is used as the modified nano anti-settling agent to participate in manufacturing of the insulation paint in the embodiments. The solvent A1 is ethanol, and the surface modifier A2 is a silane coupling agent.

Kaolinite of a micron granularity with purity higher than 95% is dispersed in a solvent B1, and mechanical stirring (a stirring rate is 1000 rpm) is performed in a condition of 50° C. to obtain an evenly dispersed suspension. First, a surface modifier B2 is added to the suspension to react for 30 min, and then a coupling agent B3 is added to continue to react for 50 min. Centrifugal purification, drying, grinding, and sieving (more than 200 meshes) are performed on a reacted suspension to obtain a micron heat-conducting additive that undergoes surface lipophilic modification. The micron heat-conducting additive that undergoes surface lipophilic modification is used as a modified heat-conducting additive or the modified inorganic layered silicate to participate in manufacturing of the insulation paint in the embodiments. The solvent B1 may be water, the surface modifier B2 is an octadecyl quaternary ammonium salt, and the coupling agent B3 may be a silane coupling agent.

70 parts by weight of the unsaturated polyesterimine, 13 parts by weight of the reactive diluent (which may be methacrylate), and 1.5 parts by weight of the dispersing agent (which may be BYK220S) are evenly mixed for 60 min in a reactor. Then, 10 parts by weight of the modified nano anti-settling agent is added, and ultrasonic dispersion (ultrasonic parameters are 1500 W and 40 kHz) and mechanical stirring (a stirring rate is 500 rpm) are performed for 30 min in a condition of 50° C. to obtain nano modified insulation paint whose nano particles are evenly dispersed. Afterwards, 1 part by weight of the modified inorganic layered silicate is added to the nano modified insulation paint, and mechanical stirring (a stirring rate is 1500 rpm) is performed for 30 min in a condition of 90° C. Finally, 1 part by weight of the anti-foaming agent (which may be BYK099), 0.5 parts by weight of the leveling agent (which may be BYK380), and 3 parts by weight of the peroxide (which may be a Di-tert-butyl peroxide) are added, and in a condition of 20° C., stirring is performed for 60 min and vacuum degassing is performed for 30 min, to obtain micron/nano modified insulation paint with high conductivity used for a motor, that is, the insulation paint provided in the embodiments.

Embodiment 3

A mixture that is of titanium dioxide and silicon dioxide and that is of a nano granularity with purity higher than 99%

(a weight ratio between the titanium dioxide and the silicon dioxide is 1:1) is dispersed in a solvent A1. Ultrasonic dispersion (ultrasonic parameters are 1500 W and 20 kHz) and mechanical stirring (a stirring rate is 300 rpm) are performed in a condition of 50° C. to obtain an evenly dispersed suspension. A surface modifier A2 is added to the suspension, and reaction time is 30 min. Centrifugal purification, drying, grinding, and sieving (more than 200 meshes) are performed on a reacted suspension to obtain a nano anti-settling agent that undergoes surface lipophilic modification. The obtained nano anti-settling agent that undergoes surface lipophilic modification is used as the modified nano anti-settling agent to participate in manufacturing of the insulation paint in the embodiments. The solvent A1 is water, and the surface modifier A2 is a titanate coupling agent.

A mica disc of a micron granularity with purity higher than 95% is dispersed in a solvent B1, and mechanical stirring (a stirring rate is 300 rpm) is performed in a condition of 80° C. to obtain an evenly dispersed suspension. First, a surface modifier B2 is added to the suspension to react for 90 min, and then a coupling agent B3 is added to continue to react for 60 min. Centrifugal purification, drying, grinding, and sieving (more than 200 meshes) are performed on a reacted suspension to obtain a micron heat-conducting additive that undergoes surface lipophilic modification. The micron heat-conducting additive that undergoes surface lipophilic modification is used as a modified heat-conducting additive or the modified inorganic layered silicate to participate in manufacturing of the insulation paint in the embodiments. The solvent B1 may be ethanol, the surface modifier B2 is an octadecyl quaternary ammonium salt, and the coupling agent B3 may be a titanate coupling agent.

55 parts by weight of the unsaturated polyesterimine, 18 parts by weight of the reactive diluent (which may be vinyltoluene), and 1 part by weight of the dispersing agent (which may be Disperbyk 110) are evenly mixed for 30 min in a reactor. Then, 2 parts by weight of the modified nano anti-settling agent is added, and ultrasonic dispersion (ultrasonic parameters are 300 W and 60 kHz) and mechanical stirring (a stirring rate is 300 rpm) are performed for 90 min in a condition of 70° C. to obtain nano modified insulation paint whose nano particles are evenly dispersed. Afterwards, 20 parts by weight of the modified inorganic layered silicate is added to the nano modified insulation paint, and mechanical stirring (a stirring rate is 1000 rpm) is performed for 40 min in a condition of 50° C. Finally, 1.3 parts by weight of the anti-foaming agent (which may be BYK055), 1.2 parts by weight of the leveling agent (which may be BYK333), and 1.5 parts by weight of the peroxide (which may be Di-(tert-butylperoxy) cyclohexane) are added, and in a condition of 25° C., stirring is performed for 45 min and vacuum degassing is performed for 30 min, to obtain micron/nano modified insulation paint with high conductivity used for a motor, that is, the insulation paint provided in the embodiments.

Embodiment 4

Titanium dioxide of a nano granularity with purity higher than 99% is dispersed in a solvent A1. Ultrasonic dispersion (ultrasonic parameters are 800 W and 30 kHz) and mechanical stirring (a stirring rate is 1200 rpm) are performed in a condition of 80° C. to obtain an evenly dispersed suspension. A surface modifier A2 is added to the suspension, and reaction time is 90 min. Centrifugal purification, drying, grinding, and sieving (more than 200 meshes) are performed on a reacted suspension to obtain a nano anti-settling agent that undergoes surface lipophilic modification. The obtained nano anti-settling agent that undergoes surface lipophilic modification is used as the modified nano anti-settling agent to participate in manufacturing of the insulation paint in the embodiments. The solvent A1 is ethanol, and the surface modifier A2 is a titanate coupling agent.

A mica disc of a micron granularity with purity higher than 95% is dispersed in a solvent B1, and mechanical stirring (a stirring rate is 700 rpm) is performed in a condition of 30° C. to obtain an evenly dispersed suspension. First, a surface modifier B2 is added to the suspension to react for 60 min, and then a coupling agent B3 is added to continue to react for 30 min. Centrifugal purification, drying, grinding, and sieving (more than 200 meshes) are performed on a reacted suspension to obtain a micron heat-conducting additive that undergoes surface lipophilic modification. The micron heat-conducting additive that undergoes surface lipophilic modification is used as a modified heat-conducting additive or the modified inorganic layered silicate to participate in manufacturing of the insulation paint in the embodiments. The solvent B1 may be ethanol, the surface modifier B2 is a hexadecyl quaternary ammonium salt, and the coupling agent B3 may be a titanate coupling agent.

60 parts by weight of the unsaturated polyesterimine, 15 parts by weight of the reactive diluent (which may be styrene), and 0.5 parts by weight of the dispersing agent (which may be Disperbyk 130) are evenly mixed for 50 min in a reactor. Then, 5 parts by weight of the modified nano anti-settling agent is added, and ultrasonic dispersion (ultrasonic parameters are 600 W and 30 kHz) and mechanical stirring (a stirring rate is 600 rpm) are performed for 40 min in a condition of 60° C. to obtain nano modified insulation paint whose nano particles are evenly dispersed. Afterwards, 15 parts by weight of the modified inorganic layered silicate is added to the nano modified insulation paint, and mechanical stirring (a stirring rate is 300 rpm) is performed for 50 min in a condition of 70° C. Finally, 0.7 parts by weight of the anti-foaming agent (which may be BYK065), 1.8 parts by weight of the leveling agent (which may be BYK354), and 2 parts by weight of the peroxide (which may be tert-Butyl peroxybenzoate) are added, and in a condition of 30° C., stirring is performed for 30 min and vacuum degassing is performed for 30 min, to obtain micron/nano modified insulation paint with high conductivity used for a motor, that is, the insulation paint provided in the embodiments.

Embodiment 5

Silicon dioxide of a nano granularity with purity higher than 99% is dispersed in a solvent A1. Ultrasonic dispersion (ultrasonic parameters are 1500 W and 20 kHz) and mechanical stirring (a stirring rate is 300 rpm) are performed in a condition of 50° C. to obtain an evenly dispersed suspension. A surface modifier A2 is added to the suspension, and reaction time is 30 min. Centrifugal purification, drying, grinding, and sieving (more than 200 meshes) are performed on a reacted suspension to obtain a nano anti-settling agent that undergoes surface lipophilic modification. The obtained nano anti-settling agent that undergoes surface lipophilic modification is used as the modified nano anti-settling agent to participate in manufacturing of the insulation paint in the embodiments. The solvent A1 is water, and the surface modifier A2 is a titanate coupling agent.

A mixture that is of kaolinite and a mica disc and that is of a micron granularity with purity higher than 95% (a weight ratio between the kaolinite and the mica disc is 1:1) is dispersed in a solvent B1, and mechanical stirring (a stirring rate is 300 rpm) is performed in a condition of 80° C. to obtain an evenly dispersed suspension. First, a surface modifier B2 is added to the suspension to react for 90 min, and then a coupling agent B3 is added to continue to react for 60 min. Centrifugal purification, drying, grinding, and sieving (more than 200 meshes) are performed on a reacted suspension to obtain a micron heat-conducting additive that undergoes surface lipophilic modification. The micron heat-conducting additive that undergoes surface lipophilic modification is used as a modified heat-conducting additive or the modified inorganic layered silicate to participate in manufacturing of the insulation paint in the embodiments. The solvent B1 may be ethanol, the surface modifier B2 is an octadecyl quaternary ammonium salt, and the coupling agent B3 may be a titanate coupling agent.

65 parts by weight of the unsaturated polyesterimine, 20 parts by weight of the reactive diluent (which may be vinyltoluene), and 0.6 parts by weight of the dispersing agent (which may be BYK220S) are evenly mixed for 30 min in a reactor. Then, 2 parts by weight of the modified nano anti-settling agent is added, and ultrasonic dispersion (ultrasonic parameters are 300 W and 60 kHz) and mechanical stirring (a stirring rate is 300 rpm) are performed for 90 min in a condition of 70° C. to obtain nano modified insulation paint whose nano particles are evenly dispersed. Afterwards, 10 parts by weight of the modified inorganic layered silicate is added to the nano modified insulation paint, and mechanical stirring (a stirring rate is 1000 rpm) is performed for 40 min in a condition of 50° C. Finally, 0.8 parts by weight of the anti-foaming agent (which may be BYK055), 0.6 parts by weight of the leveling agent (which may be BYK380), and 1 part by weight of the peroxide (which may be Di-(tert-butylperoxy) cyclohexane) are added, and in a condition of 25° C., stirring is performed for 45 min and vacuum degassing is performed for 30 min, to obtain micron/nano modified insulation paint with high conductivity used for a motor, that is, the insulation paint provided in the embodiments.

Embodiment 6

Titanium dioxide of a nano granularity with purity higher than 99% is dispersed in a solvent A1. Ultrasonic dispersion (ultrasonic parameters are 800 W and 30 kHz) and mechanical stirring (a stirring rate is 1200 rpm) are performed in a condition of 80° C. to obtain an evenly dispersed suspension. A surface modifier A2 is added to the suspension, and reaction time is 90 min. Centrifugal purification, drying, grinding, and sieving (more than 200 meshes) are performed on a reacted suspension to obtain a nano anti-settling agent that undergoes surface lipophilic modification. The obtained nano anti-settling agent that undergoes surface lipophilic modification is used as the modified nano anti-settling agent to participate in manufacturing of the insulation paint in the embodiments. The solvent A1 is ethanol, and the surface modifier A2 is a titanate coupling agent.

A mixture that is of a mica disc and montmorillonite and that is of a micron granularity with purity higher than 95% (a weight ratio between the mica disc and the montmorillonite is 2:1) is dispersed in a solvent B1, and mechanical stirring (a stirring rate is 700 rpm) is performed in a condition of 30° C. to obtain an evenly dispersed suspension. First, a surface modifier B2 is added to the suspension to react for 60 min, and then a coupling agent B3 is added to continue to react for 30 min. Centrifugal purification, drying, grinding, and sieving (more than 200 meshes) are performed on a reacted suspension to obtain a micron heat-conducting additive that undergoes surface lipophilic modification. The micron heat-conducting additive that undergoes surface lipophilic modification is used as a modified heat-conducting additive or the modified inorganic layered silicate to participate in manufacturing of the insulation paint in the embodiments. The solvent B1 may be ethanol, the surface modifier B2 is a hexadecyl quaternary ammonium salt, and the coupling agent B3 may be a titanate coupling agent.

50 parts by weight of the unsaturated polyesterimine, 5 parts by weight of the reactive diluent (which may be styrene), and 0.5 parts by weight of the dispersing agent (which may be Disperbyk 130) are evenly mixed for 50 min in a reactor. Then, 5 parts by weight of the modified nano anti-settling agent is added, and ultrasonic dispersion (ultrasonic parameters are 600 W and 30 kHz) and mechanical stirring (a stirring rate is 600 rpm) are performed for 40 min in a condition of 60° C. to obtain nano modified insulation paint whose nano particles are evenly dispersed. Afterwards, 35 parts by weight of the modified inorganic layered silicate is added to the nano modified insulation paint, and mechanical stirring (a stirring rate is 300 rpm) is performed for 50 min in a condition of 70° C. Finally, 0.7 parts by weight of the anti-foaming agent (which may be BYK065), 1.8 parts by weight of the leveling agent (which may be BYK354), and 2 parts by weight of the peroxide (which may be tert-Butyl peroxybenzoate) are added, and in a condition of 30° C., stirring is performed for 30 min and vacuum degassing is performed for 30 min, to obtain micron/nano modified insulation paint with high conductivity used for a motor, that is, the insulation paint provided in the embodiments.

Performance of the insulation paint manufactured in Embodiment 1 to Embodiment 6 is tested and a result is shown in Table 2.

16 insulation paint of a rotor winding of the motor), a heat dissipation capability of the motor in a use process can be improved, and a temperature rise of the motor in the use process can be reduced, thereby improving power of the motor and prolonging a service life of the motor.

The foregoing descriptions are merely embodiments but are not intended as limiting. Any variation or replacement readily figured out by a person skilled in the art shall fall within the scope of the embodiments.

What is claimed is:

1. A method for improving a heat dissipation capability of an oil-cooled motor, comprising:
   performing insulation processing on a motor component by using insulation paint, wherein the motor component comprises a stator winding and/or a rotor winding; and
   installing the motor component undergoing the insulation processing into an oil-cooled motor, wherein a basic component of the insulation paint is unsaturated polyesterimine modified by using an inorganic layered silicate,
   wherein a length of particle size of the inorganic layered silicate is between 1 and 1000 microns, and a length-diameter ratio of the inorganic layered silicate is greater than 300.

2. The method for improving a heat dissipation capability of an oil-cooled motor according to claim 1, wherein a weight percentage of the inorganic layered silicate in the insulation paint ranges from 1 wt % to 35 wt %, and a weight percentage of the unsaturated polyesterimine in the insulation paint ranges from 40 wt % to 70 wt %.

3. The method for improving a heat dissipation capability of an oil-cooled motor according to claim 1, wherein the inorganic layered silicate is a modified inorganic layered silicate that undergoes surface lipophilic modification.

4. The method for improving a heat dissipation capability of an oil-cooled motor according to claim 1, wherein the

TABLE 2

| | | Performance test result | | | | | |
|---|---|---|---|---|---|---|---|
| Key feature | | Embodiment 1 | Embodiment 2 | Embodiment 3 | Embodiment 4 | Embodiment 5 | Embodiment 6 |
| Viscosity | cps | 1980 | 941 | 1460 | 1220 | 1050 | 1130 |
| Heat conductivity | W/m · K | 0.852 | 0.352 | 0.687 | 0.534 | 0.412 | 0.613 |
| Breakdown strength | kV/mm | 22 | 28 | 26 | 25.7 | 27 | 24.6 |
| Dielectric loss | | 0.47 | 0.43 | 0.38 | 0.46 | 0.37 | 0.41 |
| Dielectric constant | | 4.69 | 3.54 | 4.45 | 4.26 | 4.15 | 4.23 |
| Volume resistivity | Ω · m | $3.2 \times 10^{13}$ | $4.8 \times 10^{14}$ | $5.6 \times 10^{13}$ | $8.6 \times 10^{13}$ | $1.5 \times 10^{14}$ | $4.6 \times 10^{13}$ |
| Tensile strength | MPa | 23.1 | 27.8 | 24.8 | 25.3 | 25.6 | 25.1 |
| Bonding strength (twisted coil) | N | 46 | 68 | 52 | 56 | 61 | 58 |

It may be understood from Table 2 that the insulation paint manufactured in each embodiment has relatively low viscosity, relatively high heat conductivity, relatively large breakdown strength, a relatively low dielectric loss (dielectric losses), a relatively high dielectric constant, relatively high volume resistivity, relatively large tensile strength, and relatively large bonding strength. In other words, the insulation paint manufactured in each embodiment has high heat conductivity, high heat resistance, and low viscosity. When the insulation paint is used in a motor (for example, used as insulation paint of a stator winding of the motor and as inorganic layered silicate in the insulation paint comprises any one or a combination of a plurality of montmorillonite, kaolinite, and a mica disc.

5. The method for improving a heat dissipation capability of an oil-cooled motor according to claim 1, wherein the insulation paint further comprises a modified nano anti-settling agent whose weight percentage ranges from 0.5 wt % to 10 wt %; the modified nano anti-settling agent is an inorganic nano spherical oxide that undergoes surface lipophilic modification; and the inorganic nano spherical oxide comprises any one or a combination of two of silicon dioxide and titanium dioxide.

6. The method for improving a heat dissipation capability of an oil-cooled motor according to claim 1, wherein components of the insulation paint are as follows:

unsaturated polyesterimine: 40 wt % to 70 wt %;
   modified nano anti-settling agent: 0.5 wt % to 10 wt %;
   modified inorganic layered silicate: 1 wt % to 35 wt %;
   reactive diluent: 5 wt % to 20 wt %;
   anti-foaming agent: 0.1 wt % to 2.5 wt %;
   leveling agent: 0.1 wt % to 2.5 wt %;
   dispersing agent: 0.1 wt % to 2.5 wt %; and
   peroxide: 0.5 wt % to 3 wt %.

* * * * *